United States Patent [19]

Steuck

[11] Patent Number: 4,944,879

[45] Date of Patent: Jul. 31, 1990

[54] MEMBRANE HAVING HYDROPHILIC SURFACE

[75] Inventor: Michael J. Steuck, North Reading, Mass.

[73] Assignee: Millipore Corporation, Bedford, Mass.

[21] Appl. No.: 385,641

[22] Filed: Jul. 27, 1989

[51] Int. Cl.$^5$ .................... B01D 67/00; B01D 69/00; B01D 71/00
[52] U.S. Cl. ................ 210/500.27; 264/22; 264/41; 264/236
[58] Field of Search .............. 264/22, 25, 41, 236; 210/500.34–500.43, 500.27, 500.1

[56] References Cited

U.S. PATENT DOCUMENTS 4,268,463  5/1981  Aoyagi et al. ............... 210/500.34

*Primary Examiner*—Frank Sever
*Attorney, Agent, or Firm*—Andrew T. Karnakis; Paul J. Cook

[57] ABSTRACT

A composite porous membrane is formed from a porous polymeric membrane having desired bulk properties on which is directly coated a cross-linked polymer having desired surface properties. The composite membrane retains the porosity of the porous polymeric membrane. The cross-linked surface polymer is produced from a crosslinkable monomer or polymer by energy from an electron beam in the absence of a chemical polymerization initiator.

57 Claims, No Drawings

MEMBRANE HAVING HYDROPHILIC SURFACE

BACKGROUND OF THE INVENTION

This invention relates to a microporous or ultrafiltration membrane formed from a hydrophobic substrate having a hydrophilic surface including the membrane pore surfaces and to a process for forming such a membrane.

In many applications of filtration technology, it is desirable to utilize a membrane filter which is mechanically strong, is thermally stable, is relatively inert chemically and is insoluble in most organic solvents. Often, it is desirable that the membrane have surface properties which are radically different from, and sometimes incompatible with the bulk properties set forth above. Desirable surface properties include wettability, low protein adsorbing tendency, thromborestivity, controlled ion exchange capacity and controlled surface chemical reactivity.

Conventional methodology presently used to achieve the duality of function of bulk properties which differ from the surface properties is to coat a performed membrane having the desired bulk properties with an oligomer or polymer having the desired surface properties. Typical coating materials include surfactants and water soluble polymers such as polyvinylpyrrolidone. This approach to modifying surface properties is undesirable since the coating is only temporary and exposure to any process fluid, particularly when the substrate having the desired bulk properties is a porous membrane, effects removal of the coating from the porous membrane. Membranes treated in this fashion cannot be steam sterilized, cannot be rewet once dried after being wetted with water and exhibit high extractable levels. These properties are unacceptable in many filtration applications, particularly when processing biological fluids which are to be sterilized or subsequently analyzed.

It also has been proposed to utilize graft polymerization techniques to modify the surface characteristics of a polymeric substrate. Typical examples of graft polymerization are shown for example in U.S. Pat. Nos. 3,253,057; 4,151,225; 4,278,777 and 4,311,573. It is difficult to utilize presently available graft polymerization techniques to modify the surface properties of the porous membrane. This is because it is difficult to modify the entire surface of the membrane including the surfaces within the pores while avoiding pore blockage and while retaining membrane porosity. In U.S. Pat. No. 4,340,482, issued July 20, 1982, it has been proposed to modify the surface of porous membranes formed from hydrophobic fluorine-containing polymers by binding a primary amine such a glycine to the hydrophobic substrate. The primary amine renders the polymer surface hydrophilic and can be utilized as a reactant site to link a polymerizable monomer to the porous membrane thereby to obtain a porous membrane having surface properties corresponding to that of the polymerized monomer. Unfortunately, the modified membranes so-produced exhibit properties which are undesirable for use with certain materials. Thus, the membrane so-produced oftentimes is colored that is, a nonwhite color, and gives off colored extractable compositions during use. Furthermore, the membranes have a tendency to adsorb proteins from solution and therefore are unacceptable in some applications such as in clinical diagnostic assays. It has been proposed in U.S. Pat. No. 4,618,533 to form a porous membrane having a porous membrane substrate to which is directly coated a cross linked polymer formed from a monomer polymerized with a free radical initiator in situ on the substrate. The resulting composite membrane has essentially the same porous configuration as the porous substrate. It is disclosed that the presence of a polymerization initiator and a crosslinking agent are necessary in order to effect the desired polymerization and crosslinking in situ thereby to obtain the desired porous configuration of the membrane product, i.e., little or no blockage of the pores. It has been found that when the composite membrane produced by the process is wet, that some swelling of the hydrophilic coating occurs which results in some pore blockage during use. In addition, the presence of a low molecular weight, incompletely cross-linked coating can result in small amounts of extractable being released in solution during use of the membrane. Accordingly, it would be desirable to provide a composite membrane having desired bulk and surface properties which retain its porosity even when wet and which has very low levels of extractables.

SUMMARY OF THE INVENTION

This invention provides a composite porous membrane comprising a porous membrane substrate having characteristic bulk properties and having a permanent coating grafted and/or deposited thereon for the entire porous membrane including the inner pore walls which coating is hydrophilic. The coating polymer can be directly coated onto the substrate polymer or coated on a substrate polymer which previously has been coated with an intermediate polymer without the use of a chemical polymerization initiator. In the absence of an intermediate polymer, a crosslinking agent is added to the monomer. When the intermediate polymer is employed, it functions as a crosslinking agent, and, in this case, a separate crosslinking agent need not be included. However, it can be included if desired. The bulk properties of the porous membrane include inertness to most organic solvents, inertness to many chemical reagents, good tensile strength and ductility. The porous composite membrane has essentially the same porous configuration as the membrane substrate both when dry and when wet. The composite membranes of this invention can be used in filtration processes which utilize organic solvents as in the pharmaceutical industry and with liquids containing concentrated acids as is commonly encountered in the electronic industries.

DESCRIPTION OF SPECIFIC EMBODIMENTS

In accordance with this invention a polymeric porous membrane having the desired bulk properties is directly coated throughout its entire surface with a hydrophilic polymerized cross-linked monomer. The polymeric porous membrane can be uncoated or coated with an intermediate polymer prior to being coated with a cross-linked monomer. The monomer is deposited on the surfaces of the porous membrane by graft polymerization and/or by deposition of the cross-linked monomer. When an intermediate polymer is employed an additional crosslinking agent is not needed since the intermediate polymer functions as a crosslinking agent. In the absence of the intermediate polymer, a crosslinking agent is needed. The desired deposition of the cross-linked monomer onto the porous membrane is effected as a direct coating and does not require or utilize an intermediate binding chemical moiety such as an amino acid or the like and does not utilize a chemical polymerization initiator. The term "polymer" as used herein is meant to include polymeric compositions formed from one or more monomers. Representative suitable polymers forming the porous membrane include polyolefins such as polyethylene, polypropylene, polymethylpentene, or the like; polystyrene or substituted polystyrenes; fluorinated polymers including poly(tetra fluorethylene), polyvinylidene fluoride or the like; poly sulfones such as polysulfone, polyethersulfone or the like; polyesters including polyethylene terephthalate, polybutylene terephthalate or the like; polyamides including poly (hexamethylene adipamide), poly (phenylene terephthalamide) or the like; polyacrylates and polycarbonates; vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like. The only requirement for the polymerized monomer is that it is capable of coating the entire surface of the porous membrane and that it provide surface with different properties than the bulk porous membrane. Generally, the porous membrane has an average pore size between about 0.001 and 10 microns and more usually between about 0.1 and 5.0 microns.

When an intermediate coating polymer is utilized, it functions to promote coating of the porous substrate with the cross-linked monomer. A solution of the intermediate polymer is applied to the porous polymer membrane. The concentration of the intermediate polymer in solution is such as to evenly coat the porous membrane without blocking the pores and is usually between about 1 and 20% by weight of the solution. Thereafter, the intermediate polymer is cross-linked by being exposed to an electron beam; alternately, the polymerizable monomer can be coated on the porous polymer membrane and both the intermediate polymer and monomer can be cross-linked with an electron beam. Suitable intermediate polymers include polybutadiene, polyvinyl chloride, atactic polypropylene, thermoplastic polyurethane, polyamides (Nylon 66), polyisobutylene, and the like. which exhibit the ability to graft to the porous membrane substrate when exposed to electron beam energy.

The polymerization and cross-linking of the polymerizable monomer to the porous membrane by grafting and/or deposition must be effected so that the entire surface of the porous membrane including the inner surfaces of the pores is coated entirely with a cross-linked/grafted polymer. Therefore, in a first step, the porous membrane is washed with a solvent composition that does not swell or dissolve the porous membrane and which wets the surfaces of the pores such as a mixture of water and an organic solvent. Suitable water-solvent compositions for this purpose include methanol/water, ethanol/water, acetone/water, tetrahydro-furan/water or the like. The purpose of this wetting step is to assure that the monomer composition subsequently contacted with the porous membrane wets the entire surface of the porous membrane. This preliminary wetting step can be eliminated when the reagent bath described below itself functions to wet the entire surface of the porous membrane. This can be effected when the reagent both contains a high concentration of organic reactants, for example 15% by weight or higher. In any event, all that is required is that the entire porous surface of the porous membrane be wet.

Subsequent to wetting the porous membrane substrate, a reagent bath comprising a free radical polymerizable monomer and a crosslinking agent in a solvent is contacted with the porous membrane which is optionally coated with intermediate polymer and exposed to electron beam radiation at least about 0.1M rad for a time of at least about 0.1 seconds to effect polymerization of the monomer and coating of the porous membrane with the cross-linked polymer. When the intermediate polymer is utilized, a crosslinking agent need not be used since the intermediate polymer functions as a crosslinking agent. It has been found that complete coating of the porous membrane substrate with the cross-linked polymer can be effected without the need of a chemical polymerization initiator. Furthermore, it has been found that the product of this invention exhibits very low or no porosity loss when it is wet. The products of this invention are characterized by a porosity loss of less than 20%, when wet.

Any monomer for coating the polymer can be utilized herein so long as it is capable of being polymerized by free radical polymerization and can be cross-linked. Representative suitable polymerizable monomers include hydroxylalkyl acrylates or methacrylates including 1-hydroxyprop-2-yl acrylate and 2-hydroxyprop-1-yl acrylate, hydroxypropyl-methacrylate 2,3-dihydroxypropyl acrylate, hydroxyethylacry-late, hydroxyethyl methacrylate or the like or mixtures thereof. Other polymerizable monomers which can be utilized herein include acrylic acid, 2-N,N-dimethylaminoethyl meth-acrylate, sulfoethylmethacrylate or the like, acrylamides, methacrylamides, ethacrylamides, etc. These monomers are examples of polar-substituted or functionally substituted monomers useful herein.

The particular solvent employed for the polymerizable monomer, will depend upon the particular monomer employed and upon the particular polymer utilized to form the porous membrane. All that is necessary is that the monomer dissolve in the solvent and that the solvent does not attack the porous membrane substrate. Thus, the particular solvent system used will depend upon the monomer and porous membranes employed. Representative suitable solvents include water or organic solvents such as alcohols, esters, acetone or compatible aqueous mixtures thereof.

Generally, the polymerizable monomer is present in the reactant solution at a concentration between about 1% and about 20%, preferably between about 10% and about 15% based upon the weight of the reactant solution. When a cross-linking agent other than an intermediate polymer is utilized, the crosslinking agent is present in a concentration of between about 1% and about 20% based upon the weight of the monomer.

Reaction can be effected while the porous membrane is immersed in solution. However, this will result in the polymerization of the monomer throughout the solution. It is preferred to saturate the porous membrane with the reactant solution and to effect reaction outside of the solution so that monomer is not wasted. Thus, the reaction can be conducted batchwise or continuously. When operating as a continuous process, a sheet of porous membrane is saturated with the reactant solution and then transferred to a reaction zone where it is exposed to energy from the electron beam to effect the polymerization reaction.

The following examples illustrate the present invention and are not intended to limit the same.

In the following examples, the following applies:

Flow Time

Flow time is a measure of the effect of the coating thickness on the membrane pore size. If the coating is very thin, then the change in the pore size of the membrane is small and the change in the flow time will be small. If the coating thickness is large, then the change in the membrane pore size and in the flow time will be large. Flow time of the membrane is measured before and after modification to determine the degree of pore restriction that has occurred. The per cent of the original flow that is retained by the modified membrane is calculated. The greater the retention of original flow, the more desirable is the membrane.

The flow time is measured under specific and reproducible conditions. The standard method for determining flow time used herein is to measure the time in seconds required for 500 ml of water to flow through a 47 mm disk of membrane in a glass filter holder at 27.5 inches mercury vacuum.

Rewet Time

The ability of a modified membrane to wet with water spontaneously is an important property of a modified membrane. The rewet time is determined by dropping the membrane onto water and measuring the time in seconds for the membrane to wet through. This is observed visually by the membrane becoming darker as it wets.

GENERAL PROCEDURE FOR MEMBRANE MODIFICATION

The following procedure describes a general method for the treatment of membranes by electron beam radiation to produce a modified membrane surface. The membrane to be treated is wet in methanol, rinsed in water, and soaked in the aqueous monomer/crosslinker solution for several minutes to assure complete exchange. If the monomer/crosslinker solution is capable of wetting the membrane directly, the prewet exchange steps are not necessary. The wet membrane is sandwiched between sheets of polyester and gently pressed with a rubber roller to achieve a uniform loading of monomer/crosslinker solution. The pressed membrane is removed from the polyester sandwich and taped to a new sheet of polyester, which then is in turn taped to the polyester carrier belt of an Energy Sciences, Inc. 18 inch pilot coater/laminator and electron beam processor. The electron beam processor is set to deliver the desired dose at 150–200 KV with a maximum current of 50 mAmp. The electron beam processor runs at 10 to 200 feet per minute under these exposure conditions. After the desired dose has been delivered, the treated membrane is rinsed in water and/or methanol to remove unreacted and oligomeric materials. The membrane is then dried and tested for rewet, flow and other properties.

COMPARATIVE EXAMPLES 1-9

These examples do not use a crosslinking monomer and are intended to demonstrate that the known art produces membranes with very high amounts of membrane blockage.

Poly(vinylidene fluoride) membrane ($0.2\mu$ pore size,) Was treated with aqueous 2-hydroxypropyl acrylate as described in the general procedures above. The rewet time and the flow time of the resulting membrane are shown in Table 1.

TABLE 1

| Example Number | % HPA IN Treatment Solution | EB Exposure (MRad) | Rewet Time (sec) | % Change in Flow Time |
|---|---|---|---|---|
| 1 | 10 | 1 | phobic | 78 |
| 2 | 10 | 2.5 | 2.5 | 37.5 |
| 3 | 10 | 5 | 1.5 | 24 |
| 4 | 20 | 1 | phobic | 154 |
| 5 | 20 | 2.5 | 90 | 157 |
| 6 | 20 | 5 | 0.5 | 178 |
| 7 | 30 | 1 | 2.5 | no flow |
| 8 | 30 | 2.5 | 17 | no flow |
| 9 | 30 | 5 | 15 | no flow |

EXAMPLES 10-30

These examples use a combination of monomer and crosslinker at a constant ratio of 10:1. poly(vinylidene fluoride) membrane ($0.2\mu$ pore size) was treated with aqueous 2-hydroxypropyl acrylate (HPA) and tetraethylene glycol diacrylate (TEGDA) as described in the general procedure above. The rewet time and the flow time of the resulting membrane are shown in Table 2.

TABLE 2

| Example Number | % HPA In Treatment Solution | % TEGDA In Treatment Solution | EB Exposure (MRad) | Rewet Time (sec) | % Change in Flow Time |
|---|---|---|---|---|---|
| 10 | 0 | 0 | 0 | phobic | 0 |
| 11 | 3 | 0.3 | 0.5 | 16 hours | 1.9 |
| 12 | 3 | 0.3 | 1 | 16 hours | 3.3 |
| 13 | 3 | 0.3 | 2.5 | 60 | 3.3 |
| 14 | 3 | 0.3 | 5 | 20 | 12.9 |
| 15 | 4 | 0.4 | 0.5 | 1.5 | 7.1 |
| 16 | 4 | 0.4 | 1 | 12 | 1.9 |
| 17 | 4 | 0.4 | 2.5 | 4.5 | 6.2 |
| 18 | 4 | 0.4 | 5 | 2.5 | 6.6 |
| 19 | 5 | 0.5 | 0.5 | 4 | 4.3 |
| 20 | 5 | 0.5 | 1 | 4 | 8.1 |
| 21 | 5 | 0.5 | 2.5 | 2 | 8.6 |
| 22 | 5 | 0.5 | 5 | 2 | 5.7 |
| 23 | 6 | 0.6 | 0.5 | 0.5 | 13.3 |
| 24 | 6 | 0.6 | 1 | 0.5 | 14.8 |
| 25 | 6 | 0.6 | 2.5 | 0.5 | 11.4 |
| 26 | 6 | 0.6 | 5 | 0 | 10 |
| 27 | 7 | 0.7 | 0.5 | 3600 | 5.7 |
| 28 | 7 | 0.7 | 1 | 0.5 | 18.1 |
| 29 | 7 | 0.7 | 2.5 | 0 | 12.9 |
| 30 | 7 | 0.7 | 5 | 0 | 12.4 |

EXAMPLES 31–45

In these examples the ratio of HPA to TEGDA was varied. Poly(vinylidene fluoride) membrane (0.2μ pore size; was treated with aqueous 2-hydroxypropyl acrylate (HPA) and tetraethylene glycol diacrylate (TEGDA) as described in the general procedure above. The rewet time and the flow time of the resulting membrane are shown in Table 3.

TABLE 3

| Example Number | % HPA In Treatment Solution | % TEGDA In Treatment Solution | EB Exposure (MRad) | Rewet Time (sec) | % Change in Flow Time |
|---|---|---|---|---|---|
| 31 | 6.3 | 0.3 | 0.5 | 3 | 11.8 |
| 32 | 6.3 | 0.3 | 1 | 3 | 7 |
| 33 | 6.3 | 0.3 | 2.5 | 1 | 13.25 |
| 34 | 6.3 | 0.3 | 5 | 1 | 12.3 |
| 35 | 6.4 | 0.2 | 0.5 | 4 | 7.95 |
| 36 | 6.4 | 0.2 | 1 | 6 | 10.8 |
| 37 | 6.4 | 0.2 | 2.5 | 2 | 10.4 |
| 38 | 6.4 | 0.2 | 5 | 1.5 | 11.8 |
| 39 | 5.8 | 0.8 | 0.5 | 0 | 35.9 |
| 40 | 5.8 | 0.8 | 1 | 0 | 32.5 |
| 41 | 5.8 | 0.8 | 2.5 | 0 | 18.1 |
| 42 | 5.8 | 0.8 | 5 | 0 | 11.8 |
| 43 | 0 | 3 | 1 | 0 | 13.1 |
| 44 | 0 | 3 | 2.5 | 0 | 35.4 |
| 45 | 0 | 3 | 5 | 0 | 31.1 |

EXAMPLES 46–57

Poly(vinylidene fluoride) membrane (0.2μ pore size) was treated with 2-hydroxylpropyl acrylate (HPA) and tetraethylene glycol diacrylate (TEGDA) in 30% aqueous t-butyl alcohol as described in the general procedure above. Since this treatment solution wets the dry membrane, no prewetting and exchange steps are necessary. The rewet time and the flow time of the resulting membrane are shown in Table 4.

TABLE 4

| Example Number | % HPA In Treatment Solution | % TEGDA In Treatment Solution | EB Exposure (MRad) | Rewet Time (sec) | % Change in Flow Time |
|---|---|---|---|---|---|
| 46 | 6 | 0.6 | 0.5 | 90 | 0 |
| 47 | 6 | 0.6 | 1 | 30 | 4.6 |
| 48 | 6 | 0.6 | 2.5 | 5 | 6.9 |
| 49 | 6 | 0.6 | 5 | 30 | 8.6 |
| 50 | 7 | 0.7 | 0.5 | 4 | 4 |
| 51 | 7 | 0.7 | 1 | 1 | 12.6 |
| 52 | 7 | 0.7 | 2.5 | 1 | 11.4 |
| 53 | 7 | 0.7 | 5 | 1 | 12 |
| 54 | 8 | 0.8 | 0.5 | 3 | 17.1 |
| 55 | 8 | 0.8 | 1 | 1 | 18.3 |
| 56 | 8 | 0.8 | 2.5 | 2 | 42.9 |
| 57 | 8 | 0.8 | 5 | 1.5 | 22.3 |

EXAMPLES 58–77

These examples use a combination of monomer and crosslinker at a constant ratio of 10:1. Poly(vinylidene fluoride) membrane (0.2μ pore size) was treated with aqueous 2-hydroxypropyl acrylate (HPA) and tetraethylene glycol diacrylate (TEGDA) as described in the general procedure above. The rewet time and the flow time of the resulting membrane are shown in Table 5.

TABLE 5

| Example Number | % HPA In Treatment Solution | % TEGDA In Treatment Solution | EB Exposure (MRad) | Rewet Time (sec) | % Change in Flow Time |
|---|---|---|---|---|---|
| 58 | 4.5 | 0.45 | 0.5 | 1 | 5.1 |
| 59 | 4.5 | 0.45 | 1 | 1 | 1.7 |
| 60 | 4.5 | 0.45 | 2.5 | 1 | 5.1 |
| 61 | 4.5 | 0.45 | 5 | 0 | 1.1 |
| 62 | 5 | 0.5 | 0.5 | 1 | 5.1 |
| 63 | 5 | 0.5 | 1 | 0.5 | 9.1 |
| 64 | 5 | 0.5 | 2.5 | 0.5 | 6.9 |
| 65 | 5 | 0.5 | 5 | 0.5 | 5.1 |
| 66 | 5.5 | 0.55 | 0.5 | 0.5 | 9.7 |
| 67 | 5.5 | 0.55 | 1 | 0.5 | 11.4 |
| 68 | 5.5 | 0.55 | 2.5 | 0.5 | 9.7 |
| 69 | 5.5 | 0.55 | 5 | 0 | 12 |
| 70 | 6 | 0.6 | 0.5 | 0.5 | 14.9 |
| 71 | 6 | 0.6 | 1 | 0 | 12.6 |
| 72 | 6 | 0.6 | 2.5 | 0.5 | 9.1 |
| 73 | 6 | 0.6 | 5 | 0.5 | 14.3 |
| 74 | 6.5 | 0.65 | 0.5 | 0.5 | 10.3 |
| 75 | 6.5 | 0.65 | 1 | 0.5 | 20 |
| 76 | 6.5 | 0.65 | 2.5 | 0.5 | 13.7 |

TABLE 5-continued

| Example Number | % HPA In Treatment Solution | % TEGDA In Treatment Solution | EB Exposure (MRad) | Rewet Time (sec) | % Change in Flow Time |
|---|---|---|---|---|---|
| 77 | 6.5 | 0.65 | 5 | 0.5 | 20.6 |

EXAMPLES 78–85

Polypropylene membrane (0.2μ pore size) was treated with aqueous 2-hydroxypropyl acrylate (HPA) and tetraethylene glycol diacrylate (TEGDA) as described in the general procedure above. The rewet time and the flow time of the resulting membrane are shown in Table 6.

TABLE 6

| Example Number | % HPA In Treatment Solution | % TEGDA In Treatment Solution | EB Exposure (MRad) | Rewet Time (sec) | % Change in Flow Time |
|---|---|---|---|---|---|
| 78 | 2 | 2 | 0.5 | phobic | 8.6 |
| 79 | 2 | 2 | 1 | 35 | 11.3 |
| 80 | 2 | 2 | 2.5 | 25 | 0 |
| 81 | 2 | 2 | 5 | 12 | 6.1 |
| 82 | 2 | 1 | 0.5 | phobic | 1 |
| 83 | 2 | 1 | 1 | 900 | 4.7 |
| 84 | 2 | 1 | 2.5 | 900 | 0 |
| 85 | 2 | 1 | 5 | 7 | 6.2 |

EXAMPLES 86–97

These examples illustrate the use of a polymeric crosslinking agent which as been precoated onto a membrane substrate. The coated membrane is then wet with monomer solution and exposed to electron beam radiation to effect crosslinking/grafting.

Poly(vinylidene fluoride) membrane (0.2μ pore size) was wet in a % solution of polybutadiene (PB) in tetrahydrofuran and air dried. The coated membrane was then wet in methanol, exchanged in water, and soaked in aqueous acrylic acid (AA) solution. The general procedure outlined above was followed. The results are presented in Table 7.

TABLE 7

| Example Number | % PB In Coating Solution | % AA In Treatment Solution | EB Exposure (MRad) | % Weight Gain AA | % Change in Flow Time |
|---|---|---|---|---|---|
| 86 | 3 | 15 | 0.5 | 2.0 | 1.6 |
| 87 | 3 | 15 | 1 | 1.9 | 0 |
| 88 | 3 | 15 | 2.5 | 2.4 | 0 |
| 89 | 3 | 15 | 5 | 2.7 | 0.5 |
| 90 | 3 | 15 | 10 | 3.2 | 0 |
| 91 | 3 | 15 | 20 | 3.4 | 0 |
| 92 | 5 | 15 | 0.5 | 1.7 | 6.3 |
| 93 | 5 | 15 | 1 | 1.7 | 4.2 |
| 94 | 5 | 15 | 2.5 | 2.1 | 3.7 |
| 95 | 5 | 15 | 5 | 2.5 | 3.7 |
| 96 | 5 | 15 | 10 | 3.1 | 7.9 |
| 97 | 5 | 15 | 20 | 3.7 | 10 |

EXAMPLES 98–101

Poly(vinylidene fluoride) membrane (0.2μ pore size) was wet in a solution of 2% nylon 66 in formic acid and air dried. The coated membrane was then wet in methanol, exchanged in water, and soaked in 5% aqueous acrylic acid (AA) solution. The general procedure outlined above was followed. The results are presented in Table 8.

TABLE 8

| Example Number | EB Exposure (MRad) | Rewet Time (sec) | % Change in Flow Time |
|---|---|---|---|
| 98 | 0.5 | phobic | 3.2 |
| 99 | 1 | phobic | 6.3 |
| 100 | 2.5 | phobic | 4.7 |
| 101 | 5 | 3 | 5.3 |

EXAMPLES 102–111

Polypropylene membrane (0.2μ) was wet in methanol, exchanged into water, and then soaked in aqueous solutions of 2-hydroxypropyl acrylate/tetraethylene glycol diacrylate or 2-hydroxypropyl acrylate alone. The results are presented in Table 9.

TABLE 9

| Example Number | % HPA In Treatment Solution | % TEGDA In Treatment Solution | EB Exposure (MRad) | Rewet Time (sec) | % Change in Flow Time |
|---|---|---|---|---|---|
| 102 | 3 | 0 | 0.5 | phobic | 0 |
| 103 | 3 | 0 | 1 | phobic | 0 |
| 104 | 3 | 0 | 2.5 | phobic | 0 |
| 105 | 3 | 0 | 5 | phobic | 0 |
| 106 | 3 | 1 | 0.5 | 5 | 0 |
| 107 | 3 | 1 | 1 | 2 | 0 |
| 108 | 3 | 1 | 2.5 | 1 | 0 |
| 109 | 3 | 1 | 5 | 2 | 0 |
| 110 | 3 | 2 | 0.5 | 0 | 11.5 |
| 111 | 3 | 2 | 1 | 0 | 23.0 |

EXAMPLES 112-115

These examples were prepared in similar fashion to Examples 102-111 except that mixed cellulose acetate/cellulose nitrate membrane was used in place of polypropylene. The results are presented in Table 10.

TABLE 10

| Example Number | % HPA In Treatment Solution | % TEGDA In Treatment Solution | EB Exposure (MRad) | Rewet Time (sec) | % Change in Flow Time |
| --- | --- | --- | --- | --- | --- |
| 112 | 3 | 0.3 | 0.5 | 1 | 30.3 |
| 113 | 3 | 0.3 | 1 | 1 | 18.9 |
| 114 | 3 | 0.3 | 2.5 | 1 | 18.2 |
| 115 | 3 | 0.3 | 5 | 1 | 22.0 |

EXAMPLE 116

The procedure used for Examples 102-111 was repeated using polyethylene-backed polytetrafluoroethylene membrane (0.2μ). The results are shown in Table 11.

TABLE 11

| Example Number | % HPA In Treatment Solution | % TEGDA In Treatment Solution | EB Exposure (MRad) | Rewet Time (sec) | % Change in Flow Time |
| --- | --- | --- | --- | --- | --- |
| 116 | 3 | 2 | 0.5 | 0 | 0 |

EXAMPLES 117-124

The procedure used for Examples 102-111 was repeated using Nylon 66 membrane (0.2μ). The results are shown in Table 12.

TABLE 12

| Example Number | % HPA In Treatment Solution | % TEGDA In Treatment Solution | EB Exposure (MRad) | Rewet Time (sec) | % Change in Flow Time |
| --- | --- | --- | --- | --- | --- |
| 117 | 3 | 0.3 | 0.5 | 0 | 0 |
| 118 | 3 | 0.3 | 1 | 0 | 1.0 |
| 119 | 3 | 0.3 | 2.5 | 0 | 3.7 |
| 120 | 3 | 0.3 | 5 | 0 | 6.4 |
| 121 | 5 | 0.5 | 0.5 | 0 | 2.0 |
| 122 | 5 | 0.5 | 1 | 0 | 7.7 |
| 123 | 5 | 0.5 | 2.5 | 0 | 0.3 |
| 124 | 5 | 0.5 | 5 | 0 | 2.3 |

PROTEIN BINDING OF TREATED MEMBRANES

The protein binding of several treated membranes was qualitatively determined by exposing the membranes to bovine hemoglobin (2 mg/ml in phosphate buffered saline (PBS) for 15 minutes, followed by two PBS rinses. The amount of hemoglobin bound was ranked from +(membrane noticeably colored), +/-, -, and -/- (much less colored than the control membrane). The results are presented in Table 13.

TABLE 13

| Example Number | Membrane Type | Treated or Control | Hemoglobin Adsorption |
| --- | --- | --- | --- |
| ... | Nylon | Control | + |
| 124 | Nylon | Treated | - |
| ... | Cell. | Control | + |
| 115 | Cell. | Treated | -/- |
| ... | PP | Control | + |
| 111 | PP | Treated | +/- |
| 108 | PP | Treated | - |
| ... | PTFE | Control | + |
| 116 | PTFE | Treated | +/- |

I claim:

1. A composite porous thermoplastic membrane which comprises a porous membrane substrate having an average pore size between about 0.001 and 10 microns formed of a first polymer, said substrate being directly coated on its entire surface with a cross-linked second polymer formed from a monomer and crosslinking agent polymerized with energy from an electron beam of at least 0.1M rad, said composite porous membrane further comprising essentially the same porous configuration as said porous membrane substrate and properties for providing a porosity loss of less than about 20% when wet.

2. The composite porous membrane of claim 1 wherein the first polymer is a halogenated hydrocarbon polymer.

3. The composite porous membrane of claim 1 wherein the first polymer is a fluorinated hydrocarbon polymer.

4. The composite porous membrane of claim 1 wherein the first polymer is polyvinylidene fluoride.

5. The composite porous membrane of claim 1 wherein the first polymer is polytetrafluoroethylene.

6. The composite porous membrane of claim 1 wherein the first polymer is a hydrocarbon polymer.

7. The composite porous membrane of claim 6 wherein the hydrocarbon polymer is polypropylene.

8. The composite porous membrane of claim 1 wherein the first polymer is a polysulfone polymer.

9. The composite porous membrane of claim 8 wherein said second polymer is formed from an hydroxyalkyl acrylate or methacrylate.

10. The composite porous product of claim 8 wherein the second polymer is formed from a polar substituted acrylate or methacrylate.

11. The composite porous product of claim 8 wherein the second polymer is formed from a multifunctional acrylate or methacrylate.

12. The composite porous membrane of claim 1 wherein the first polymer is a polyethersulfone polymer.

13. The process comprising: forming a composite porous membrane formed from a porous membrane substrate having an average pore size between about 0.001 and 10 microns formed of a first polymer, said substrate being directly coated over its entire surface with a cross-linked second polymer, said composite porous membrane having essentially the same porous configuration as said porous membrane substrate and providing said composite porous membrane with a porosity loss of less than about 20% when wet by
   (a) washing said porous membrane substrate to wet the surfaces of the pores in said porous membrane; and
   (b) contacting said porous membrane from step (a) with a solution of a monomer of said second polymer, and a crosslinking agent and exposing said monomer to energy from an electron beam of at least 0.1M rad to cross-link said second polymer in situ over the entire surface of said first polymer under conditions to avoid plugging of said pores, said composite porous membrane being characterized by a porosity loss of less than about 20% when wet.

14. The process of claim 13 wherein said first polymer is a halogenated hydrocarbon polymer.

15. The process of claim 13 wherein said first polymer is a fluorinated hydrocarbon polymer.

16. The process of claim 13 wherein said first polymer is polyvinylidene fluoride.

17. The process of claim 13 wherein said first polymer is poly(tetrafluoroethylene).

18. The process of claim 13 wherein said first polymer is a hydrocarbon polymer.

19. The process of claim 18 wherein the hydrocarbon is polypropylene.

20. The process of claim 13 wherein said first polymer is a polysulfone polymer.

21. The process of claim 13 wherein said first polymer is a polyethersulfone polymer.

22. The process of claim 13 wherein said first polymer is a polycarbonate polymer.

23. The process of claim 13 wherein said monomer is a hydroxy-alkyl acrylate or methacrylate.

24. The process of claim 13 wherein said monomer is an acrylamide or methacrylamide.

25. The process of claim 13 wherein said monomer is a polar- substituted acrylate or methacrylate.

26. The process of claim 13 wherein said monomer is functionally-substituted acrylate or methacrylate.

27. A composite porous thermoplastic membrane which comprises a porous membrane substrate having an average pore size between about 0.001 and 10 microns formed of a first polymer, said substrate being directly coated on its entire surface with a cross-linked grafted intermediate polymer and with a cross-linked second polymer, said intermediate polymer being cross-linked and grafted and said monomer being polymerized with energy from an electron beam of at least 0.1M rad, said composite porous membrane further comprising essentially the same porous configuration as said porous membrane substrate and properties for providing a porosity loss of less than about 20% when wet.

28. The composite porous membrane of claim 27 wherein the first polymer is a halogenated hydrocarbon polymer.

29. The composite porous membrane of claim 27 wherein the first polymer is a fluorinated hydrocarbon polymer.

30. The composite porous membrane of claim 27 wherein the first polymer is polyvinylidene fluoride.

31. The composite porous membrane of claim 27 wherein the first polymer is polytetrafluoroethylene.

32. The composite porous membrane of claim 27 wherein the first polymer is hydrocarbon polymer.

33. The composite porous membrane of claim 27 wherein the first polymer is polypropylene.

34. The composite porous membrane of claim 27 wherein the first polymer is polysulfone.

35. The composite porous membrane of claim 27 wherein said intermediate polymer is a polybutadiene.

36. The composite porous membrane of claim 27 wherein the intermediate polymer is a polyvinyl chloride.

37. The composite porous membrane of claim 27 wherein the intermediate polymer is a thermoplastic polyurethane.

38. The composite porous membrane of claim 27 wherein the intermediate polymer is a atatic polypropylene.

39. The composite porous membrane of claim 27 wherein said second polymer is formed from an hydroxyalkyl acrylate or methacrylate.

40. The composite porous product of claim 27 wherein the second polymer is formed from a polar substituted acrylate or methacrylate.

41. The composite porous product of claim 27 wherein the second polymer is formed from a multifunctional acrylate or methacrylate.

42. The process comprising forming a composite porous membrane substrate having an average pore size between about 0.001 and 10 microns formed of first polymer, said substrate being directly coated over its entire surface an intermediate polymer and with a cross-linked second polymer, said composite porous membrane having essentially the same porous configuration as said porous membrane substrate and providing said composite porous membrane with a porosity loss of less than about 20% when wet by
   (a) washing said porous membrane substrate to wet the surfaces of the pores in said porous membrane; and
   (b) contacting said porous membrane from step (a) with a solution of the intermediate polymer and then with a solution of a monomer of said second polymer, and exposing said monomer and intermediate polymer to energy from an electron beam of at least 0.1M rad to cross-link said intermediate polymer and said second polymer in situ over the entire surface of said first polymer under conditions to avoid plugging of said pores.

43. The process of claim 42 wherein said first polymer is a halogenated hydrocarbon polymer.

44. The process of claim 42 wherein said first polymer is a fluorinated hydrocarbon polymer.

45. The process of claim 42 wherein said first polymer is polyvinylidene fluoride.

46. The process of claim 42 wherein said first polymer is poly(tetrafluoroethylene).

47. The process of claim 42 wherein said first polymer is a hydrocarbon polymer.

48. The process of claim 47 wherein said hydrocarbon polymer is a polypropylene.

49. The process of claim 42 wherein said intermediate polymer is a polybutadiene.

50. The process of claim 42 wherein said intermediate polymer is a thermoplastic polyurethane.

51. The process of claim 42 wherein said intermediate polymer is atactic polypropylene.

52. The process of claim 42 wherein said first polymer is a polycarbonate polymer.

53. The process of claim 42 wherein the first polymer is a polyamide.

54. The process of claim 42 wherein said monomer is a hydroxyalkyl acrylate or methacrylate.

55. The process of claim 42 wherein said monomer is an acrylamide or methacrylamide.

56. The process of claim 42 wherein said monomer is a polar-substituted acrylate or methacrylate.

57. The process of claim 42 wherein said monomer is functionally-substituted acrylate or methacrylate.

* * * * *